(12) United States Patent
Smith et al.

(10) Patent No.: US 9,415,756 B2
(45) Date of Patent: Aug. 16, 2016

(54) SYSTEM AND METHOD FOR BRAKING SYSTEM CONTROL IN DISTRIBUTED POWER VEHICLES

(75) Inventors: Eugene A. Smith, Satellite Beach, FL (US); Mark Wayne Wheeler, Palm Beach, FL (US); James Glen Corry, Melbourne, FL (US); Robert Palanti, Melbourne, FL (US); Rabi Ratnesar, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 881 days.

(21) Appl. No.: 12/512,259

(22) Filed: Jul. 30, 2009

(65) Prior Publication Data

US 2010/0030409 A1 Feb. 4, 2010

Related U.S. Application Data

(60) Provisional application No. 61/085,578, filed on Aug. 1, 2008.

(51) Int. Cl.
*B60T 17/12* (2006.01)
*B60T 17/18* (2006.01)
*B60T 7/12* (2006.01)
*B60T 7/18* (2006.01)

(52) U.S. Cl.
CPC . *B60T 17/18* (2013.01); *B60T 7/12* (2013.01); *B60T 7/18* (2013.01)

(58) Field of Classification Search
CPC ... B60T 17/18; B60T 17/228; B60T 2270/82; B60T 7/12; B60T 7/126; B60T 7/16; B61L 15/0018; B61C 17/12
USPC ........ 701/19, 20, 76, 97, 29.2, 32.7; 370/241, 370/242, 216, 225, 228; 340/2.9
See application file for complete search history.

(56) References Cited

U.S. PATENT DOCUMENTS

| | | | |
|---|---|---|---|
| 4,553,723 A | 11/1985 | Nichols et al. | |
| 4,582,280 A * | 4/1986 | Nichols et al. | 246/182 R |
| 4,859,000 A | 8/1989 | Deno et al. | |
| 5,720,455 A | 2/1998 | Klemanski et al. | |
| 5,738,311 A | 4/1998 | Fernandez | |
| 5,740,547 A | 4/1998 | Kull et al. | |

(Continued)

FOREIGN PATENT DOCUMENTS

| | | |
|---|---|---|
| WO | WO9960735 A1 | 11/1999 |
| WO | WO2010039680 A1 | 4/2010 |
| ZA | 200101708 A | 8/2001 |

*Primary Examiner* — Spencer Patton
(74) *Attorney, Agent, or Firm* — GE Global Patent Operation

(57) ABSTRACT

A brake control system for a distributed power vehicle system includes a brake system and a distributed power control system in a first vehicle, and first and second separate communication links between the brake system and the distributed power control system. In operation, upon the initiation of a penalty brake application, the brake system transmits information about the brake level of the penalty brake application to the distributed power control system, over at least the first communication link. However, if the first communication link fails, the brake system redundantly transmits the information about the level of the penalty brake application to the distributed power control system over the second communication link. The information is transmitted from the distributed power control system in the first vehicle to remote vehicles for carrying out the penalty brake application.

5 Claims, 4 Drawing Sheets

(56) References Cited

U.S. PATENT DOCUMENTS

| | | |
|---|---|---|
| 5,785,392 A | 7/1998 | Hart |
| 5,813,635 A | 9/1998 | Fernandez |
| 5,820,226 A | 10/1998 | Hart |
| 5,833,325 A | 11/1998 | Hart |
| 5,927,822 A | 7/1999 | Hart |
| 5,934,764 A | 8/1999 | Dimsa et al. |
| 5,950,967 A | 9/1999 | Montgomery |
| 5,969,643 A | 10/1999 | Curtis |
| 5,978,718 A | 11/1999 | Kull |
| 5,986,577 A | 11/1999 | Bezos |
| 5,986,579 A | 11/1999 | Halvorson |
| 5,995,881 A | 11/1999 | Kull |
| 6,114,974 A | 9/2000 | Halvorson |
| 6,128,558 A | 10/2000 | Kernwein |
| 6,163,089 A | 12/2000 | Kull |
| 6,216,095 B1 | 4/2001 | Glista |
| 6,275,165 B1 | 8/2001 | Bezos |
| 6,322,025 B1 | 11/2001 | Colbert et al. |
| 6,360,998 B1 | 3/2002 | Halvorson et al. |
| 6,377,215 B1 | 4/2002 | Halvorson et al. |
| 6,401,015 B1 * | 6/2002 | Stewart et al. .................. 701/19 |
| 6,782,044 B1 | 8/2004 | Wright et al. |
| 7,416,262 B2 | 8/2008 | Ring |
| 8,157,218 B2 | 4/2012 | Riley et al. |
| 8,428,798 B2 | 4/2013 | Kull |
| 2003/0043739 A1 * | 3/2003 | Reinold et al. ................ 370/228 |
| 2005/0121971 A1 | 6/2005 | Ring |
| 2006/0253234 A1 * | 11/2006 | Kane et al. ..................... 701/19 |
| 2009/0105920 A1 * | 4/2009 | Fenske et al. .................. 701/70 |
| 2009/0281705 A1 * | 11/2009 | Kernwein et al. ............... 701/97 |

* cited by examiner

SYSTEM AND METHOD FOR BRAKING SYSTEM CONTROL IN DISTRIBUTED POWER VEHICLES

This application claims the benefit of U.S. Provisional Application Ser. No. 61/085,578, filed Aug. 1, 2008, incorporated by reference herein in its entirety.

FIELD

The subject matter of certain embodiments of the present invention relates to vehicles and, more particularly, to braking system applications or controls in distributed power vehicles.

BACKGROUND

In distributed power vehicle systems, two or more powered vehicles are linked together and controlled in concert to pull or otherwise move one or more non-powered load vehicles. For example, in the case of a distributed power-based train, there is typically a lead locomotive followed by a number of load railcars for hauling freight, passengers, or the like, with one or more remote locomotives distributed throughout the train for helping with moving and braking the load railcars. In operation, when a throttle setting is established in the lead locomotive (e.g., by a train operator selecting a desired notch level), a distributed power control system in the lead locomotive transmits a command to the remote locomotives for complimentary control of the remote locomotives' propulsion systems. Similarly, when a braking application is applied in the lead locomotive (e.g., application of dynamic brakes or air brakes), a command is transmitted to each remote locomotive for similarly applying its respective braking system.

Certain vehicle systems utilize what is referred to as a "penalty brake" function or application. Here, upon the occurrence of a designated stimulus or based on certain operating conditions of the vehicle (e.g., the vehicle is going over a designated speed limit), a command is initiated for automatically causing the vehicle's brake system in engage to a designated extent. That is, based upon the occurrence of certain conditions, operation of the vehicle is "penalized" by automatically causing it to slow down. In the case of a distributed power train, upon application of a penalty brake function in the lead locomotive's braking system, the braking system informs the distributed power control, which subsequently communicates a braking command to the remote locomotives for engaging their braking systems. In this manner, each locomotive is braked in a similar or complementary manner, thereby maintaining an even or equal level of braking between the lead and remote locomotives, which is important for train stability and for maintaining inter-railcar force levels within designated constraints. When a penalty brake function is applied, this may result in a full brake application of the locomotive or other vehicle (meaning the vehicle's brake system is applied to the maximum extent possible for a designated time) or a limited brake application (meaning that the vehicle's brake system is applied to some extent below the maximum extent possible, e.g., 50%, for a designated time).

In a distributed power locomotive, the locomotive's braking system communicates with the distributed power control system over a serial communication line. For a penalty braking application, the braking system communicates the level of the penalty braking application (e.g., full or limited) to the distributed power control system, enabling the distributed power control system to convey this information to remote locomotives. However, if the serial communication line goes down, malfunctions, or is otherwise unavailable for reliable communications, both the braking system and the distributed power control system default to a full brake application when the penalty brake function is initiated. (In some systems, the braking system and the distributed power control system enter into what is in effect a fault mode, and self-initiate a penalty braking application at the default full level when the serial communication line goes down). This ensures that all locomotives initiate a full brake application (representing the most severe penalty, for safety purposes), even if the distributed power control system is unaware of the designated level of the penalty braking application. This in turn ensures even levels of braking at the lead and remote locomotives, but may result in the train being slowed to a greater extent than it would have been had the communication link been active, which reduces train efficiency. Additionally, initiating a full braking application stresses the train, and can be a safety hazard in and of itself, e.g., passenger injury due to quick deceleration, train derailment, or the like.

BRIEF DESCRIPTION OF THE INVENTION

An embodiment of the present invention relates to a brake control system for a distributed power vehicle system. (As noted, "distributed power vehicle system" refers to two or more powered vehicles that are linked together and controlled in concert to move themselves and possibly pull or otherwise move one or more non-powered load vehicles.) The brake control system comprises a brake system and a distributed power control system in a first vehicle of the distributed power vehicle system. (Here, "first" refers not necessarily to a lead vehicle, but is instead an arbitrary designation for distinguishing the first vehicle from other vehicles, it being recognized that the functionality of the present invention need not necessarily be embodied solely in a lead vehicle. The first vehicle may be a first powered vehicle in the vehicle system.) The brake control system also comprises first and second separate communication links between the brake system and the distributed power control system, e.g., each link is an electrical line or lines or other communication pathway, where "separate" means that either communication link is operable despite the failure of the other.

In operation, in one aspect, upon the initiation of a penalty brake application in the distributed power vehicle system, the brake system transmits information about the brake level of the penalty brake application to the distributed power control system, over at least the first communication link. (In another embodiment, the information is transmitted over both the first and second communication links.) However, if the first communication link fails (meaning it cannot convey the information), the brake system redundantly transmits the information about the brake level of the penalty brake application to the distributed power control system over the second communication link. In either case, in another embodiment, the distributed power control system also transmits the information about the level of the penalty brake application to one or more remote vehicles (e.g., remote powered vehicles) in the distributed power control system.

In this manner, in one aspect, an independent secondary signal is provided from the brake system to the distributed power control system for conveying the level of a penalty brake application, such that the actual level of the penalty brake application implemented in the brake system can be used instead of a default penalty brake level, in cases where a primary communication link fails. This reduces or eliminates instances of unnecessarily fully actuating the brakes in a distributed power vehicle system in a penalty situation.

Another embodiment of the present invention relates to a method for controlling a braking function of a distributed power vehicle system. The distributed power vehicle system may comprise a first powered vehicle or other first vehicle and one or more remote powered vehicles (or other remote vehicles) directly or indirectly linked to the first vehicle. The first vehicle includes a braking system, a distributed power control system, and a primary communication link between the two. In the method, subsequent to failure of the primary communication link, information is transmitted from the braking system to the distributed power control system over a secondary communication link. The information relates to a penalty brake application in the vehicle system and includes a designated brake level of the penalty brake application, e.g., a full level or a limited level. ("Full" level refers to a maximum braking level in the vehicle system, based on either the limits of the physical braking mechanism or a designated maximum level that is less than the limit of the physical braking mechanism; and "limited" refers to a braking level that is less than the maximum braking level, e.g., 50% of the maximum level. In one embodiment, there are first and second designated braking levels, where the second designated braking level is less than the first designated braking level.) In another embodiment, this information is also transmitted to the one or more remote vehicles in the vehicle system, and is used as the basis for initiating respective braking applications at the first vehicle and at the one or more remote vehicles, according to the designated level of the penalty brake application.

This brief description is provided to introduce a selection of concepts in a simplified form that are further described herein. The brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventors herein have recognized any identified issues and corresponding solutions.

DESCRIPTION OF THE FIGURES

The present invention will be better understood from reading the following description of non-limiting embodiments, with reference to the attached drawings, wherein below.

DETAILED DESCRIPTION

Figure 1:
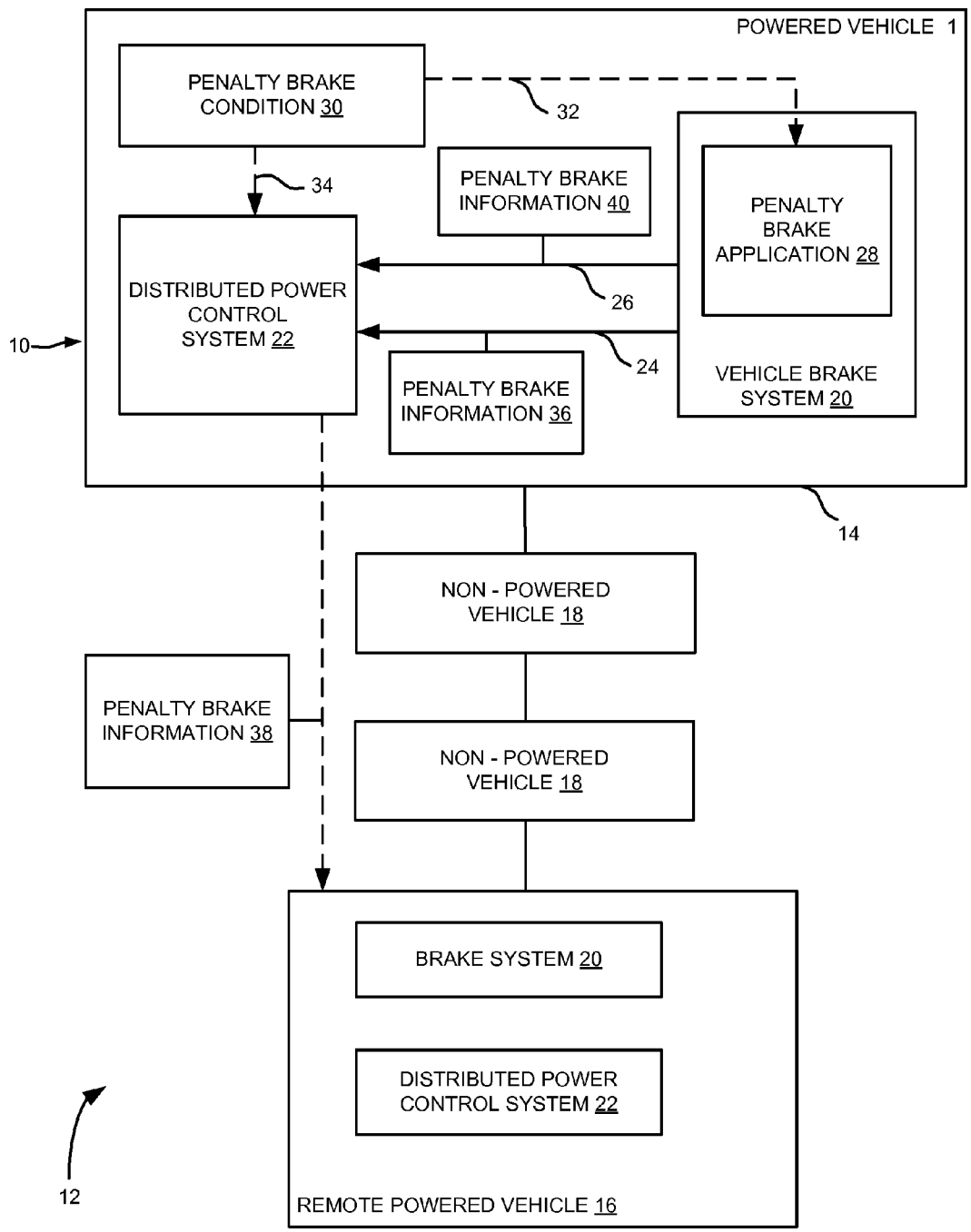
FIG. 1 is a schematic illustration of a brake control system, according to an embodiment of the present invention.

Turning first to FIG. 1, an embodiment of the present invention relates to a brake control system 10 for a distributed power vehicle system 12. (As noted above, "distributed power vehicle system" refers to two or more powered vehicles 14, 16 that are linked together and controlled in concert to move themselves and possibly pull or otherwise move one or more non-powered load vehicles 18.) The brake control system 10 includes a vehicle brake system 20 and a distributed power control system 22 in a first vehicle of the distributed power vehicle system 12, e.g., in a first powered vehicle 14. (Here, "first" refers not necessarily to a lead vehicle, but is instead an arbitrary designation for distinguishing the first vehicle 14 from other vehicles 16, it being recognized that the functionality of the present invention need not necessarily be embodied solely in a lead vehicle.) The system 10 also includes first and second separate communication links 24, 26 between the brake system 20 and the distributed power control system 22, e.g., each link 24, 26 is an electrical line/lines or other communication pathway, where "separate" means that either communication link is operable despite the failure of the other.

The distributed power vehicle system 12 may be a distributed power train having a first locomotive 14, one or more remote locomotives 16, and possibly one or more non-powered railcars 18. The train may be controlled, for example, using the Locotrol® distributed power system available from the General Electric Company. (For more information on distributed power systems generally, reference is made to U.S. Pat. No. 4,582,280, U.S. Pat. No. 4,553,723, and U.S. Pat. No. 4,859,000.) Other examples of distributed power vehicle systems 12 include tugboats or other marine vessels (e.g., the tugboats are controlled together to move a common load), and linked mine vehicles or other off-highway vehicles.

During operation of the brake control system 10, a penalty brake application 28 is initiated in the brake system 20 in a standard manner, as a result of the occurrence of a penalty brake condition 30 in the distributed power vehicle system 12. "Penalty brake condition" 30 refers collectively to any stimulus or operating condition of the vehicle system 12 for which a penalty brake application is designated. Penalty brake conditions may include, for example: the vehicle system 12 exceeding a designated speed limit; a determination that the vehicle system 12 is in imminent threat of hitting another vehicle or other object; the vehicle system 12 passing a "stop" signal; the vehicle system 12 passing a warning signal above a designated reduced speed level; application of an emergency brake; or the like. As should be appreciated, in each such case, it is desired and designated to slow the vehicle system 12 through a penalty braking application, for safety purposes or otherwise.

Thus, upon the occurrence of a penalty brake condition 30, the brake system 20 is supplied with information 32 relating to the occurrence, and initiates a corresponding penalty brake application 28 based on the information 32, in a standard manner. (For example, the information 32 might indicate the application of a full braking operation, or the application of a limited braking operation, depending on the nature of the penalty braking condition.) The distributed power control system 22 may also be supplied with information 34 that a penalty braking condition has occurred, but in a typical distributed power vehicle system 12 such information is supplied only to the brake system and not to the distributed power control system 22. In any event, even if the distributed power control system 22 received an indication 34 of the occurrence of a penalty brake condition 30, it would not be conclusively aware of the associated braking level of the penalty brake application. This is because the level of the penalty brake application, as actually carried out by the brake system, may differ from whatever level would typically be associated with the penalty brake condition in question. For example, the brake system may receive the limited penalty application signal, but due to possible fault conditions or other circumstances/stimuli, it may not be able to apply the limited reduction, or the limited reduction is overridden and it must enforce a full penalty application. Also, there are situations where the brake system itself may experience fault conditions where it initiates a penalty brake application, e.g., loss of communication with the distributed power control system 22, failure of critical brake components, and the like.

To explain further, in certain distributed power systems, the primary communication link 24 (e.g., serial channel) is used to pass penalty brake information 36 (e.g., a "penalty active" signal and the brake application level of the penalty) to the distributed power control system 22. If the primary communication link 24 fails, then the default condition is "penalty active" by the distributed power control system 22 and the brake system. An external (to the brake system) penalty condition 30 in this situation may not be activated/present, but the brake system itself initiates the penalty brake application. This might also happen if the brake system fails, or is otherwise compromised in some manner. In such a case, even if the distributed power control system 22 were normally provided with information 34 about the occurrence of penalty brake conditions 30 external to the brake system, it would not necessarily be aware of a penalty brake condition originating in the brake system.

Once a penalty brake application 28 is initiated in the brake system 20 of the first vehicle 14, the remote vehicles (e.g., remote powered vehicles 16) are informed of the penalty brake application, to ensure even and/or coordinated braking between the vehicles 14, 16. Thus, the brake system 20 transmits information 36 about the brake level of the penalty brake application 28 to the distributed power control system 22, over the first communication link 24. (The first communication link 24 may be the primary communication link between the brake system 20 and distributed power control system 22; that is, the primary link is the link that is used unless there is a problem with the primary link.) In turn, the distributed power control system 22 transmits a signal 38 to the remote powered vehicles 16. The signal 38 contains information relating to the penalty brake application 28, which is used at each remote vehicle 16 as the basis for initiating a braking operation in its own vehicle brake system.

In the first vehicle 14, situations may arise where the first or primary communication link 24 fails, meaning it cannot convey information 36 about a penalty brake application. For example, the link 24 may lose power or be physically damaged (resulting in an open circuit condition), preventing the link from transmitting any information whatsoever. Alternatively, it may be the case that the communication link is still able to carry a signal, but the quality of the communication link has decreased to such an extent that it can no longer convey information 36 about a penalty brake application. Determinations of link failure may be made using periodic signals transmitted across the link for this purpose. For example, in some systems a "heartbeat" message is periodically exchanged between the distributed power control system and the brake system (e.g., every ½ to 1 second). If the distributed power control system or the brake system does not receive the heartbeat message for a designated time period (e.g., 5 seconds), then a link failure is declared. In the system 10, if the first communication link 24 has failed, and upon initiation of a penalty brake application 28, the brake system 20 transmits information 40 about the brake level of the penalty brake application 28 (and possibly other information) to the distributed power control system 22 over the second communication link 26. This enables the distributed power control system 22 to convey the particular level of the penalty brake application to remote vehicles 16 even when the primary/first communication link 24 has failed, preventing the unnecessary initiation of a default, full braking application in the powered vehicles 14, 16.

As should be appreciated, in the system 10 the brake system 20 and the distributed power control system 22 are not configured for a default full penalty braking application subsequent to the failure of the first communication link 24. Instead, the brake system 20 and the distributed power control system 22 are configured to communicate over the second communication link 26 upon the failure of the first communication link 24. The second communication link 26 may take different forms, including a serial communication line over which serial-encoded messages 40 are transmitted, a plurality of parallel lines over which encoded messages 40 are transmitted, a single binary line over which either a limited reduction or full reduction level is transmitted (as further discussed below), a wireless link utilizing one or more standard wireless communication protocols for transmitting messages 40 wirelessly (e.g., RF or free space optical communications), or the like.

Figure 2:
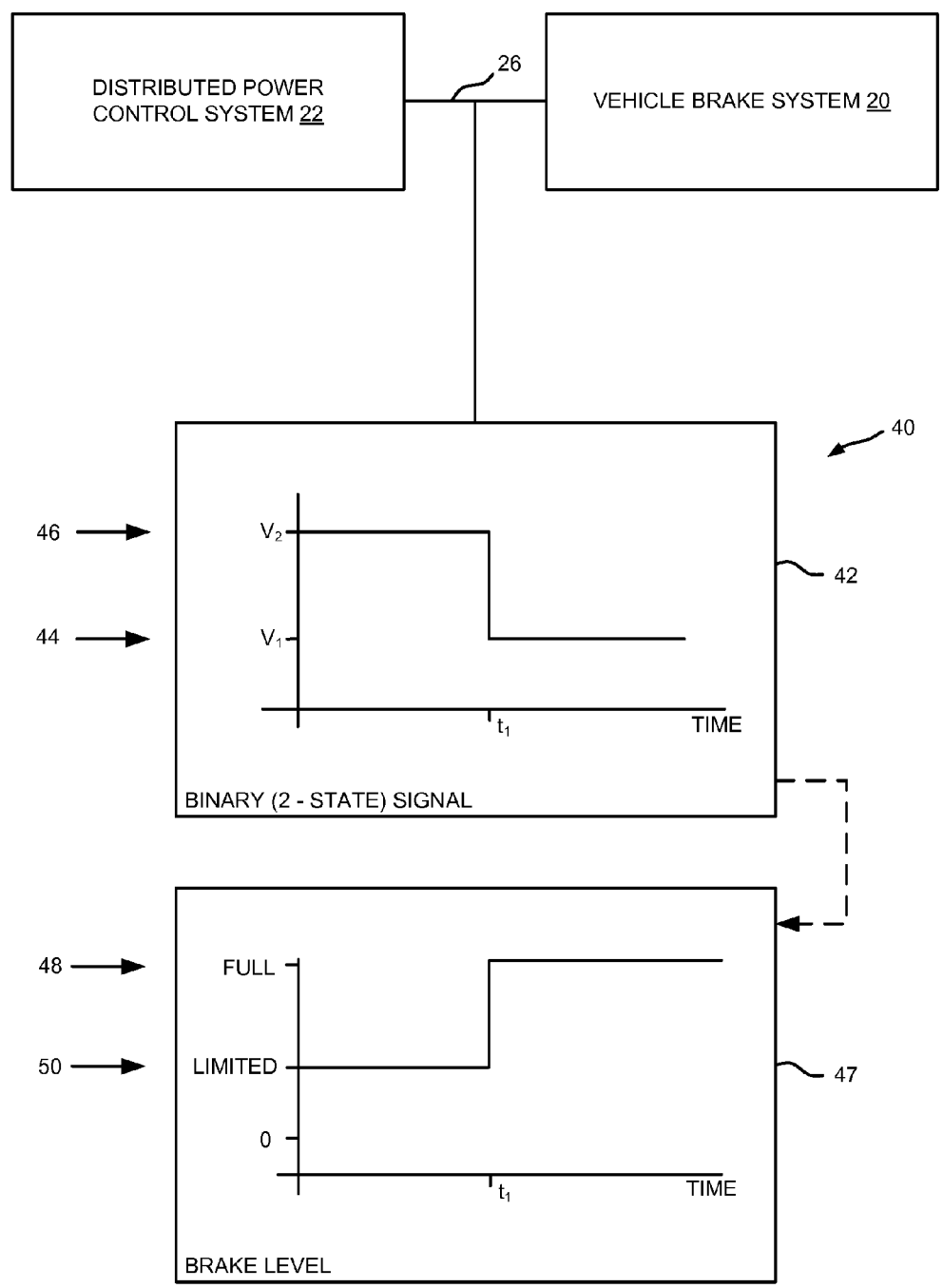
FIG. 2 is a schematic illustration of a binary communication signal, as used in an embodiment of the present invention.

FIG. 2 shows an additional embodiment of the system 10. Here, the second communication link 26 between the vehicle brake system 20 and the distributed power control system 22 is a single electrical line, e.g., a single conductor cable. Additionally, penalty brake information 40 is conveyed over the second communication link 26 as a binary signal 42. The binary signal 42 has two states or signal conditions 44, 46, which correspond to first and second designated brake levels 47. The first signal condition 44 represents a first designated brake level, e.g., a full brake level 48, for the penalty brake application. The second signal condition 46 represents a second designated brake level for the penalty brake application, e.g., a limited brake level 50. ("Full" level refers to a maximum braking level in the vehicle system, which can be based on either the limits of the physical braking mechanism in the vehicle system or a designated maximum level that is less than the limit of the physical braking mechanism. "Limited" refers to a braking level that is less than the designated maximum braking level, e.g., 50% of the maximum level; in one embodiment, there are first and second designated brake levels, where the second designated brake level is less than the first designated brake level.) Thus, upon initiation of a penalty brake application 28, and if the first/primary communication link 24 has failed, the brake system 20 sets the second communication link 26 at either the first signal condition 44 or the second signal condition 46, depending on whether the penalty brake application calls for the first or second designated braking level (e.g., full braking or limited braking), respectively. The distributed power control system 22, being aware that a penalty brake application has been initiated, determines which signal condition is present on the second communication link 26. If the first signal condition 44 is present, the distributed power control system 22 knows that the first designated level of brake application (e.g., a full brake application) is called for, and transmits this information 38 to the remote powered vehicles 16. If the second signal condition 46 is present on the second communication link 26, the distributed power control system 22 knows that the second designated level of brake application (e.g., a limited brake application) is called for, and transmits this information 38 to the remote vehicles 16. In the case of a limited brake application (e.g., a designated level less than the maximum braking level), the designated level of the limited brake application for the second signal condition 46 is established in advance as part of the system/vehicle configuration.

As indicated in FIG. 2, in one embodiment, the first and second signal conditions 44, 46 are each a different voltage level "V1" and "V2," respectively. In another embodiment, the system 10 may be configured for the first signal condition 44 (representing a full penalty brake application) to be automatically established on the second communication link 26 in the event the brake system itself fails. For example, in the case of voltage signal conditions V1 and V2, the first voltage level V1 could be zero volts (0 V) and the second voltage level V2 could be a voltage level greater than 0 V, e.g., V2>0 V. In operation, the brake system 20 normally maintains the second communication link 26 at the V2 level. For a penalty brake application 28 that requires a full braking application 48, the brake system temporarily lowers the voltage level on the second communication link 26 to the V1 level (0 V). On the other hand, for a penalty brake application 28 that requires a limited braking application 50, the brake system does nothing to the voltage level on the second communication link 26, since it is already at the level V2 designating a limited braking application. If the brake system 20 fails, for example due to a power interruption of the brake system, the voltage level on the second communication link 26 naturally falls from the higher level V2 to the lower level V1, which is 0 volts. (That is, since power is interrupted at the brake system, it cannot maintain the second communication link 26 at the V2 level, and the second communication link falls to 0 V, which is its non-powered state.) It should be noted that in the case of an air brake system for a locomotive, failure of the brake system (due to lack of power or otherwise) causes the brakes to automatically engage and do a full penalty brake application. Thus, at the same time that the air brakes automatically engage, e.g., in a lead locomotive, the distributed power control system 22 (i) detects a loss of communication with the brake system and initiates a penalty brake application, and (ii) is aware that the brakes are to be fully applied, because the voltage level of the second communication link 26 has dropped to 0 volts (which is the first signal condition 44 representing, in this example, a full brake application).

One embodiment of the present invention relates to a method for controlling a braking function of a distributed power vehicle system. The distributed power vehicle system may include a first vehicle (e.g., a first powered vehicle) and one or more remote vehicles (e.g., remote powered vehicles) linked to the first vehicle. The first vehicle includes a braking system, a distributed power control system, and a primary communication link between the two. In the method, subsequent to failure of the primary communication link, information transmitted over a secondary communication link from the braking system to the distributed power control system is passed on or otherwise used for controlling the one or more remote vehicles in the vehicle system. The information relates to a penalty brake application in the vehicle system and includes a designated brake level of the penalty brake application, e.g., a full level or a limited level. This information is used as the basis for initiating respective braking applications at the first vehicle and at the one or more remote vehicles, according to the designated level of the penalty brake application.

Figure 3:
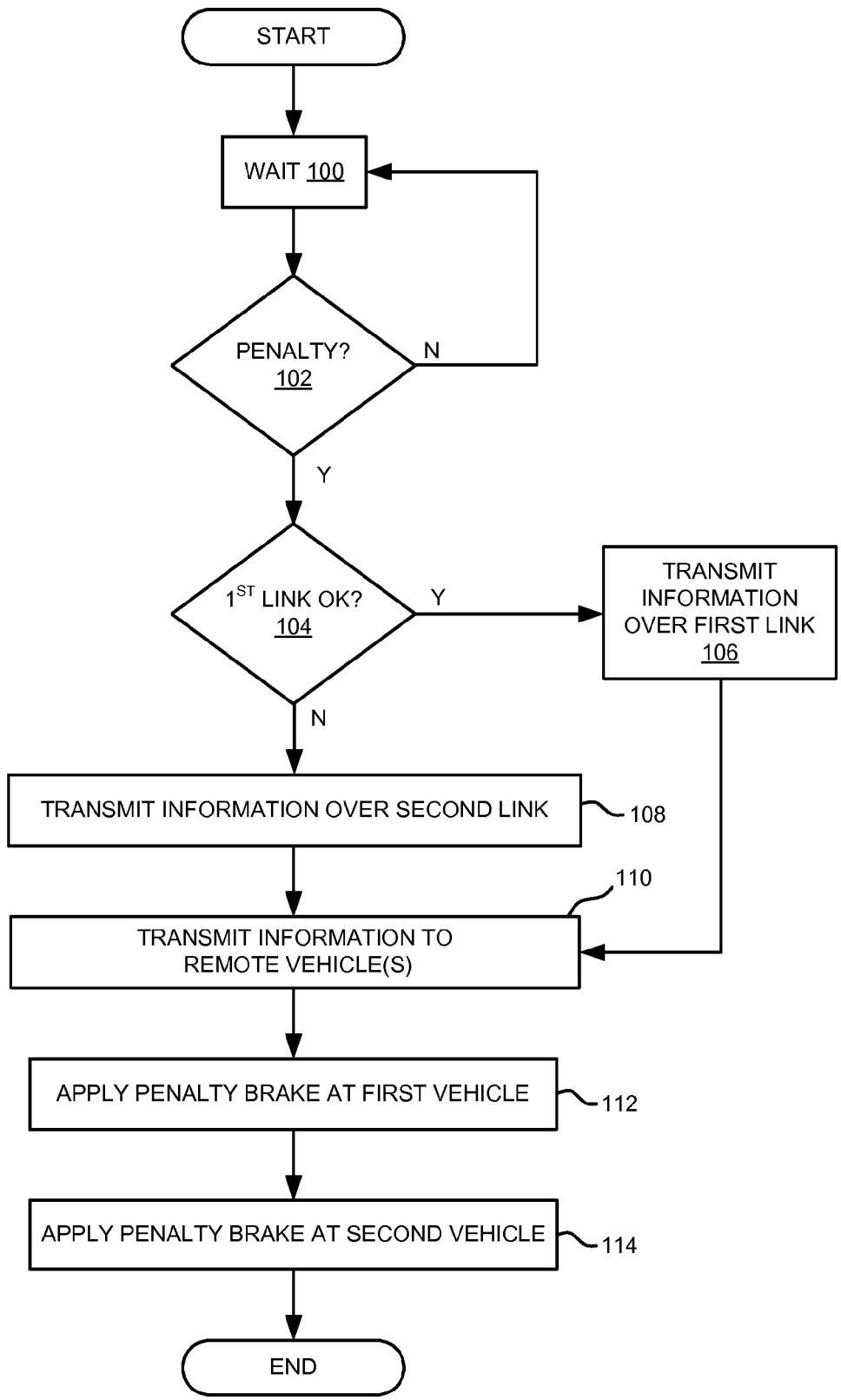
FIGS. 3 and 4 are flow charts illustrating the steps of two embodiments of a method for controlling a braking function of a distributed power vehicle system, according to the present invention.

The flow chart in FIG. 3 summarizes another embodiment of the method for controlling a braking function of a distributed power vehicle system. At Step 100, the brake system 20 waits for a penalty brake application 28, as determined at Step 102. For a penalty brake application, the brake system determines at Step 104 if a first or primary communication link 24 is operational. If so, information relating to the penalty brake application is transferred to the distributed power control system 22 over the primary communication link 24, as at Step 106. If on the other hand the primary communication link has failed, information relating to the penalty brake application is transferred to the distributed power control system 22 over a secondary communication link 26, as at Step 108. In either case, the distributed power control system 22 transmits information relating to the penalty brake application to the remote vehicles 16, as at Step 110. Subsequently, the penalty braking application is carried out at the first/lead vehicle 14, as at Step 112, and at the remote vehicles 16, as at Step 114.

Figure 4:
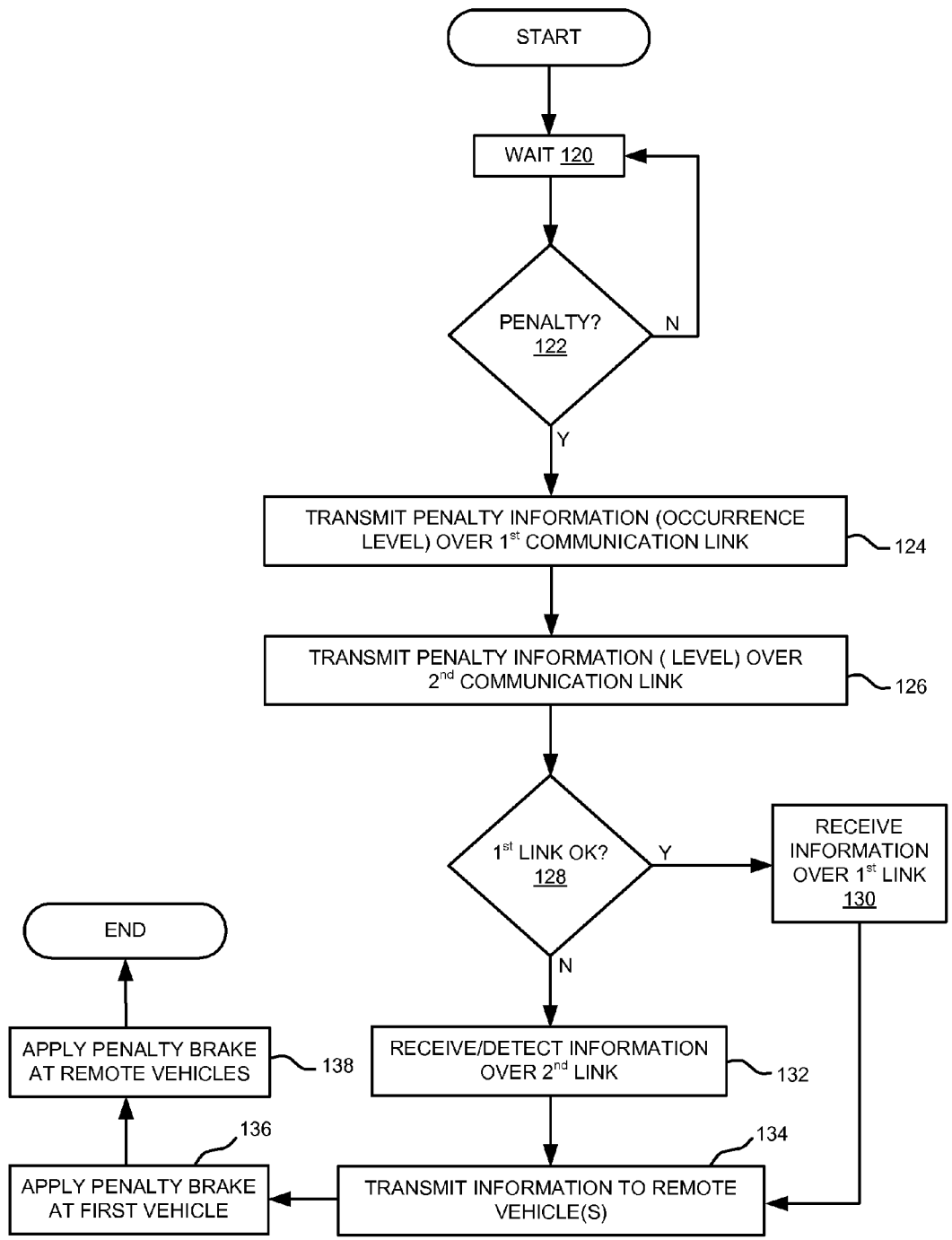

The flow chart in FIG. 4 summarizes another embodiment of the method for controlling a braking function of a distributed power vehicle system. At Step 120, the brake system 20 waits for a penalty brake application 28, as determined at Step 122. For a penalty brake application, the brake system transmits information about the penalty application (e.g., an indication that it has occurred and its level) to the distributed power control system over a first communication link 24, as at Step 124. At Step 126, the brake system transmits the level information over the second link 26, e.g., as explained above in reference to FIG. 2. Step 128 involves determining if the first link 24 is operational. If so, the penalty brake information that was transferred to the distributed power control system 22 over the primary communication link 24 is received by the distributed power control system 22, at Step 130. If on the other hand the primary communication link has failed, the level information transmitted over the second communication link 26 is received/detected by the distributed power control system 22, as at Step 132 (for example, the distributed power control system may determine the voltage level present on the link 26, as described above). In either case, the distributed power control system 22 transmits information relating to the penalty brake application to the remote vehicles 16, as at Step 134. Subsequently, the penalty braking application is carried out at the first/lead vehicle 14, as at Step 136, and at the remote vehicles 16, as at Step 138.

The steps described above in FIGS. 3 and 4 (or similar steps) may be carried out in a different order (or some steps may be carried out concurrently), depending on how the system 10 is specifically configured in operation and on whether and how the system 10 is integrated into an existing distributed power system.

For example, in one embodiment the brake system 20: (i) monitors the health of the first link 24, e.g., determines if the first link has failed; (ii) transmits penalty brake information over the first link if the first link is healthy; and (iii) transmits penalty brake information over the second link if the first link has failed. In another embodiment, the distributed power control system 22 monitors the health of the first link 24 and communicates information about the health of the first link to the brake system 20 for transmissions over the first link or the second link as above. In another embodiment, the brake system 20 transmits the penalty brake information over both the first link and the second link, e.g., one copy of the penalty brake information is sent over the first link and another, identical copy is sent over the second link. The distributed power control system monitors the health of the first link, and if it is determined that the first link has failed, the distributed power control system uses the penalty brake information received over the second link. The determination of first link failure may be an implied determination, e.g., if the information is received over the second link but not the first link, or if the information received over the first link is unusable, corrupted, or otherwise, this is an implied determination that the first link has failed. In another embodiment, the brake system 20 attempts to transmit the penalty brake information over the first link. If it is determined that the transmission was unsuccessful (either a determination carried out by the brake system by itself, or by the brake system and distributed power control system in concert), then the brake system transmits the penalty brake information over the second link.

As noted above, in some distributed power systems the vehicle brake system automatically initiates a penalty brake application 28 when the primary communication link 24 fails. In the system 10, because of the second communication link 26, the brake system in such a distributed power system may be reconfigured for not initiating a penalty brake application when the primary link 24 fails.

A train or other distributed power vehicle system comprises a plurality of vehicles linked together. For any two vehicles in the train or other distributed power vehicle system, when it is stated that the vehicles are linked together, this means, unless otherwise specified, that the two vehicles are either linked directly together (adjacent to one another) or linked indirectly (one or more other vehicles disposed between the two vehicles).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Since certain changes may be made in the above-described system and method for braking control in a distributed power vehicle system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A method for controlling a braking function of a distributed power vehicle system having a first vehicle and at least one remote vehicle linked to the first vehicle, the method comprising:
    subsequent to failure of a primary communication link between a braking system of the first vehicle and a distributed power control system of the first vehicle, transmitting information from the braking system to the distributed power control system over a secondary communication wherein the information relates to a penalty brake application in the vehicle system and includes a designated brake level of the penalty brake application;
    transmitting the information of the designated brake level to the at least one remote vehicle; and
    initiating respective braking applications at the first vehicle and at the at least one remote vehicle based on the designated brake level of the penalty brake application;
    wherein the information transmitted from the braking system to the distributed power control system over the secondary communication link is conveyed in a binary signal having a first signal condition and a second, different signal condition, wherein the first signal condition represents a full brake level for the penalty brake application and the second signal condition represents a limited brake level for the penalty brake application, the limited brake level being less than the full brake level and greater than no application of the braking system.

2. The method of claim 1 further comprising automatically establishing the first signal condition on the secondary communication link if the braking system fails.

3. The method of claim 2 wherein the first signal condition is a first voltage level of zero volts and the second signal condition is a second voltage level that is higher than the first voltage level, and wherein if the braking system fails due to a lack of electrical power the first voltage level is automatically established due to the lack of electrical power.

4. The method of claim 1 wherein the distributed power vehicle system is a train and the first and at least one remote vehicles are locomotives.

5. The method of claim 1, wherein the primary communication link is separate from the secondary communication link such that either of the primary communication link and the secondary communication link is operable despite a failure of the other at any point between the braking system and the distributed power control system.

* * * * *